United States Patent
Dickinson

(10) Patent No.: US 7,775,935 B2
(45) Date of Patent: Aug. 17, 2010

(54) OVERRUN PREVENTION SYSTEM FOR AN AUTOMATIC TRANSMISSION

(75) Inventor: Michael T. Dickinson, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 312 days.

(21) Appl. No.: 12/046,717

(22) Filed: Mar. 12, 2008

(65) Prior Publication Data
US 2009/0233761 A1   Sep. 17, 2009

(51) Int. Cl.
*F16H 61/00* (2006.01)
(52) U.S. Cl. ...................................... 477/143
(58) Field of Classification Search .................. None
See application file for complete search history.

(56) References Cited

U.S. PATENT DOCUMENTS

| | | | |
|---|---|---|---|
| 3,721,136 A | 3/1973 | Irie | |
| 4,938,102 A | 7/1990 | Leising et al. | |
| 5,235,877 A | 8/1993 | Takahashi et al. | |
| 5,505,675 A * | 4/1996 | Kuriyama et al. | 477/156 |
| 5,573,476 A | 11/1996 | Minowa et al. | |
| 5,772,555 A | 6/1998 | Minowa et al. | |
| 6,352,492 B1 | 3/2002 | Steeby et al. | |
| 6,371,879 B1 | 4/2002 | Takahagi et al. | |
| 6,428,440 B2 | 8/2002 | Yuasa et al. | |
| 6,955,629 B2 * | 10/2005 | Nishida et al. | 477/143 |
| 6,997,837 B2 | 2/2006 | Oshima et al. | |
| 7,085,647 B1 | 8/2006 | Prucka et al. | |
| 2003/0220170 A1 * | 11/2003 | Nishida et al. | 477/143 |
| 2007/0105692 A1 | 5/2007 | Dourra et al. | |
| 2007/0220960 A1 | 9/2007 | JaVaherian | |

* cited by examiner

*Primary Examiner*—Dirk Wright
(74) *Attorney, Agent, or Firm*—Plumsea Law Group, LLC

(57) ABSTRACT

A system and method for overrun prevention is disclosed. Overrun of a one-way clutch may be prevented by determining a current torque value. When a current torque value approaches a negative value, a shift to a gear without a one-way clutch may be performed. Driving control may be increased by shifting from a gear associated with a one-way clutch when a current torque value approaches a negative value or another shifting parameter determines a shift is necessary.

20 Claims, 5 Drawing Sheets

OVERRUN PREVENTION SYSTEM FOR AN AUTOMATIC TRANSMISSION

BACKGROUND OF THE INVENTION

1. Field of the Invention

The present invention relates to motor vehicles and in particular to a motor vehicle with an automatic transmission.

2. Description of Related Art

Methods for controlling a transmission have been proposed. Leising (U.S. Pat. No. 4,938,102) is directed to a method of adaptively scheduling a shift or inhibiting a shift until the engine speed is at least equal to or greater than the output speed of the target gear. Leising teaches this method to prevent any negative torque, which further eliminates any "clunk" in the drivetrain in an automatic transmission system.

According to Leising, a power-plant (engine) reversal situation or condition exists when the wheels of the vehicle drive the engine through the transmission. The methodology taught by Leising includes steps of determining if the engine speed is at least equal to or greater than the output speed of the target gear to determine if power-plant reversal may occur. If a power-plant reversal situation exists, the methodology of Leising prevents the shift from occurring.

Leising lacks a method for preventing shock that may occur when a one-way clutch is in an overrun condition. There is a need in the art for a system and method that addresses the shortcomings of the prior art discussed above.

SUMMARY OF THE INVENTION

A system and method for detecting and preventing overrun in a one-way clutch is disclosed. Generally, these methods can be used in connection with an engine of a motor vehicle. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy, for example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a method operating a motor vehicle, comprising the steps of: receiving a set of shifting parameters; calculating a current torque value associated with a real-time engine torque; and shifting from a first gear with a one-way clutch to a second gear without a one-way clutch when the current torque value is sufficiently close to a negative torque value to substantially prevent an overrun condition of the one-way clutch.

In another aspect, the first gear is associated with a first gear ratio.

In another aspect, the second gear is associated with a second gear ratio.

In another aspect, the first gear ratio is greater than the second gear ratio.

In another aspect, the set of shifting parameters includes a throttle angle.

In another aspect, the set of shifting parameters includes a vehicle speed.

In another aspect, the invention provides a method of operating a motor vehicle, comprising the steps of: receiving a set of shifting parameters; calculating a current torque value associated with a real-time engine torque; determining a current gear; determining if the current gear is associated with a one-way clutch; executing a shift according to the shift map, the set of shifting parameters and the current engine torque when the current gear is associated with the one-way clutch; and executing a shift according to a shift map and a set of shifting parameters otherwise.

In another aspect, the one-way clutch is associated with a first gear of a transmission.

In another aspect, the second gear of the transmission includes only multi-plate clutches.

In another aspect, the step of determining the current gear includes a step of determining if the current gear is the first gear.

In another aspect, the step of executing the shift includes a step of shifting from the first gear to the second gear when the current engine torque is approaching a substantially negative value.

In another aspect, the step of executing the shift includes a step of holding first gear when the current engine torque is substantially positive.

In another aspect, the invention provides a method of operating a motor vehicle to reduce the possibility of shock associated with a transmission, comprising the steps of: receiving a set of shifting parameters; calculating a current torque value associated with a real-time engine torque; and upshifting from a first gear associated with a one-way clutch to avoid shock to the transmission when the current torque value is sufficiently close to a negative value.

In another aspect, the step of upshifting includes a step of upshifting from the first gear to a second gear.

In another aspect, the step of upshifting includes a step of upshifting from the first gear to a third gear.

In another aspect, the first gear has a first gear ratio that is greater than a second gear ratio associated with the second gear.

In another aspect, the first gear has a first gear ratio that is greater than a third gear ratio associated with the third gear.

In another aspect, the step of calculating the current torque value includes a step of receiving information from a sensor.

In another aspect, the sensor is associated with a flexplate that is configured to deform under changes in engine torque.

In another aspect, the sensor is configured to monitor mass air flow through an intake manifold of the engine.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
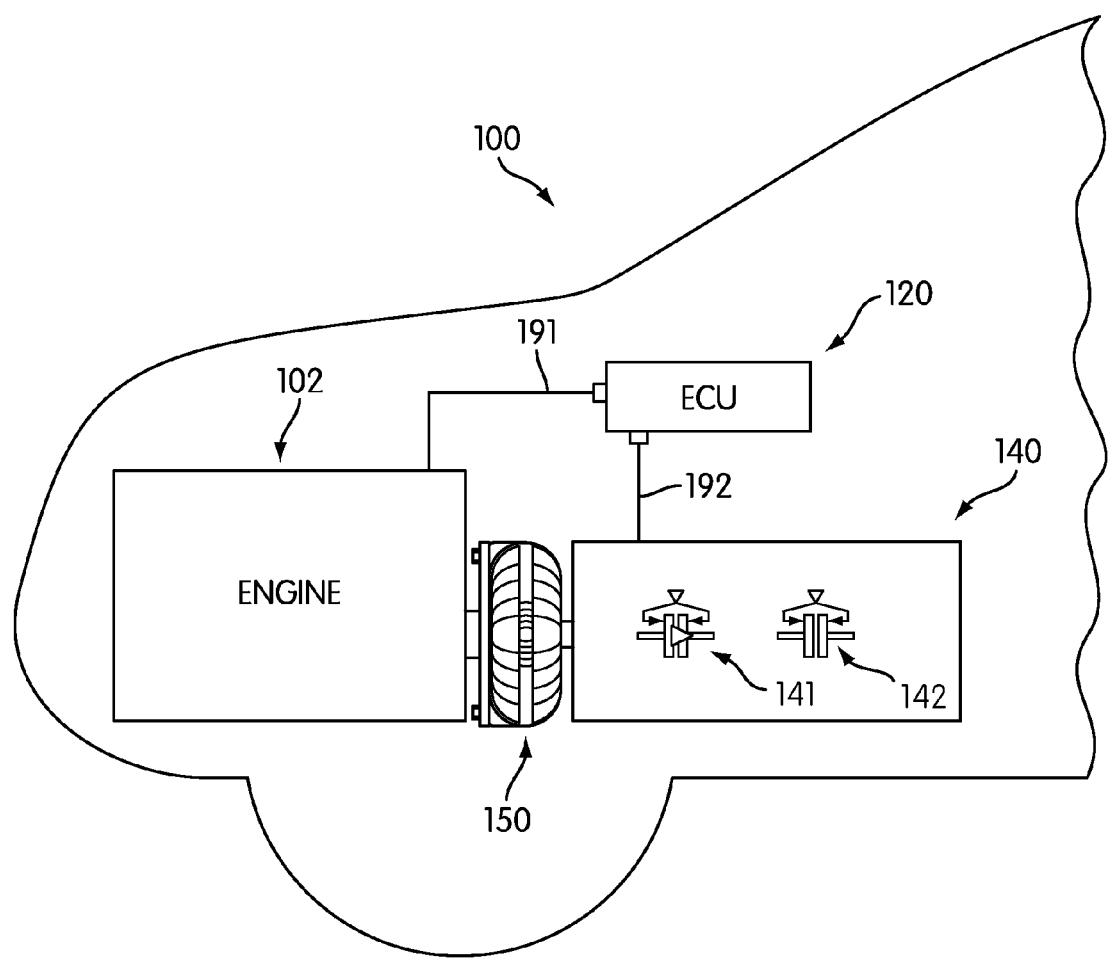
FIG. 1 is a schematic view of a preferred embodiment of a portion of a motor vehicle.

FIG. 1 is a schematic diagram of a preferred embodiment of a portion of motor vehicle 100. For purposes of illustration, motor vehicle 100 is shown as a sports utility vehicle; however it should be understood that in other embodiments motor vehicle 100 could be any type of motor vehicle including, but not limited to cars, trucks, vans, minivans, SUV's, motorcycles, scooters, boats, personal watercraft, and aircraft.

Motor vehicle 100 preferably includes engine 102. Engine 102 may be any type of engine that is capable of producing torque. In addition, motor vehicle 100 and engine 102 may be associated with other components that can assist in propelling motor vehicle 100. For clarity, only some components of motor vehicle 100 are shown in this schematic illustration. It should be understood that in other embodiments, additional components may be used with motor vehicle 100.

Engine 102 is preferably associated with transmission 140. In this embodiment, transmission 140 is preferably an automatic transmission. Transmission 140 may be any type of automatic transmission that is known in the art, including any type of hydraulic automatic transmission, manually controlled automatic transmission as well as electronically controlled transmissions. Preferably, transmission 140 is coupled with engine 102 via torque converter 150. Torque converter 150 is preferably configured to transfer rotating power between engine 102 and transmission 140 through a fluid coupling.

Transmission 140 may be associated with a set of clutches that engage one or more gearsets associated with transmission 140. Generally, clutches may be used to connect a driving shaft to a driven shaft. For example, a clutch could be used to connect the crankshaft from the engine with the wheels through the transmission. Generally, transmission 140 may include multiple types of clutches known in the art. In some embodiments, transmission 140 may include a one-way clutch. In other embodiments, transmission 140 may include multi-plate clutches. In a preferred embodiment, transmission 140 includes both one-way and multi-plate clutches. Although the following embodiments discuss transmissions with multi-plate clutches, it should be understood that in other embodiments any type of clutch capable of handling negative torque could also be used.

In this preferred embodiment, transmission 140 includes one-way clutch 141 and multi-plate clutch 142. For clarity, only clutches 141 and 142 of transmission 140 are shown in this schematic illustration. It should be understood that in other embodiments additional clutches may be included as part of transmission 140. Furthermore, transmission 140 preferably comprises additional components as well, including, but not limited to, bands, gearsets, a gear pump and a governor.

Different types of clutches may be associated with different gears. In a preferred embodiment, one-way clutch 141 may be configured to transmit torque when transmission 140 is in first gear. Preferably, one-way clutch 141 is a purely mechanical clutch that remains permanently engaged within transmission 140 at all times. Additionally, multi-plate clutch 142 may be associated with second gear. Preferably, the first gear is associated with a first gear ratio that is greater than a second gear ratio that is associated with the second gear. In other embodiments, one-way clutch 141 and multi-plate clutch 142 may be associated with other gears as well. Using this arrangement, one-way clutch 141 is only engaged within transmission 140 while motor vehicle 100 is in first gear. When an upshift to second gear occurs, multi-plate clutch 142 may be engaged as well.

It should be understood that in some embodiments, first gear may be also be associated with a multi-plate clutch of some kind. For purposes of clarity, multi-plate clutch 142 is a particular multi-plate clutch configured to transmit torque while transmission 140 is in second gear. In other embodiments, however, various other multi-plate clutches could also be used with various different gears.

Preferably, motor vehicle 100 includes provisions for communicating, and in some cases controlling, the various components associated with motor vehicle 100. In the current embodiment, motor vehicle 100 may be associated with electronic control unit 120, hereby referred to as ECU 120. In some embodiments, ECU 120 may be a computer or similar device associated with a motor vehicle. In a preferred embodiment, ECU 120 may be configured to communicate with, and/or control, engine 102 as well as additional components of motor vehicle 100 not associated with engine 102.

In the current embodiment, ECU 120 may be configured to communicate with engine 102 via first circuit 191. Generally, ECU 120 may be configured to receive information regarding parameters of engine 102 via first circuit 191. In particular, ECU 120 may receive information regarding engine speed and current throttle angle. Furthermore, ECU 120 may communicate with transmission 140 via second circuit 192. ECU 120 may receive information regarding parameters of transmission 140 via second circuit 192. Generally, circuits 191 and 192 may comprise one or more connections. In some cases, the connections could be electrical wires. In other cases, the connections could be wireless connections of some kind.

Generally, ECU 120 may be configured to communicate with, and/or control additional components of engine 102 not shown in the Figures. In other embodiments, multiple electronic control units may be used. In these other embodiments, each control unit may be associated with one or more components and be in communication with one another.

Typically, an electronic control unit may be configured to control automatic shifting according to one or more shifting parameters. Examples of various shifting parameters include, but are not limited to, current throttle angle, current transmission gear, engine speed and vehicle speed. By monitoring these various parameters associated with a motor vehicle, the electronic control unit can determine the best gear for the current driving situation in order to most effectively transfer power between engine 102 and the wheels of the motor vehicle via transmission 140. In many cases, control of a transmission may be accomplished via a shift map that sets various shift points for the transmission according to the values of various shifting parameters.

In this embodiment, ECU 120 may be configured to control automatic shifting within transmission 140 according to a shift map and one or more shifting parameters. In particular, ECU 120 may direct transmission 140 to engage multi-plate clutch 142 when a shift map indicates that motor vehicle 100 should be in second gear. ECU 120 may also engage additional clutches for first and second gear in some cases. Preferably, ECU 120 is also configured to engage additional clutches for achieving various other gears associated with transmission 140.

In some cases, particularly during times of negative engine torque, a one-way clutch may be in an overrun condition. The term "overrun", as used throughout this detailed description and in the claims, refers to a condition in which the driven shaft is disengaged from the driveshaft when the driven shaft rotates faster than the driving shaft. One-way clutch overrun typically occurs when an engine is producing negative torque. This may occur when an engine experiences relatively low throttle openings and relatively high engine speeds. If a one-way clutch experiences an overrun condition and then quickly locks due to a change in input torque, a harsh shock may be transmitted through the drivetrain. In particular, one-way clutch overrun may produce a shock when the one-way clutch is the only clutch engaged. When a clutch other than a one-way clutch is also engaged, overrunning a one-way clutch will not create a shock. In a preferred embodiment, a transmission may include provisions to substantially reduce or limit one-way clutch overrun when a one-way clutch is the only clutch engaged in order to reduce the potential of shocks to the drivetrain.

In previous designs using one-way clutches, a shift line between first gear and second gear may be set conservatively to avoid a potential overrun on a one-way clutch. For example, using previous designs, the electronic control unit may be configured to shift from first gear to second gear at a pre-determined point on the shift map regardless of the current engine torque in order to avoid one-way clutch overrun when a one-way clutch is engaged. In some cases, this upshifting to second gear may occur earlier than necessary and could be undesirable because upshifting to second gear may cause a reduction in power and traction.

In a preferred embodiment, current torque values may be monitored and a shift executed to avoid one-way clutch overrun when current torque values approach substantially negative values. In some cases, current torque values may be a single engine torque measurement at a particular time. In other cases, current torque values may be a range of engine torque measurements over a period of time. In still other cases, current torque values may be an average of engine torque measurements over a period of time. Generally, current torque values may be associated with real-time engine torque. By monitoring current torque values, an upshift may be initiated when negative torque is likely to occur instead of at a pre-determined conservative point on a shift map. With this preferred arrangement, a motor vehicle may remain in a gear associated with a one-way clutch and receive the advantages of that gear for a longer period of time.

Preferably, ECU 120 is configured to determine current engine torque values. Generally, current torque values may be determined using any method known in the art for measuring and/or calculating engine torque. In some embodiments, engine 102 could be associated with a flexplate that is configured to deform under engine torque. Additionally, a sensor could be provided on the flexplate to measure deformations of the flexplate and communicate this information to ECU 120 for determining current torque values. Details of this method are discussed in U.S. patent application 2007/0220960, the entirety of which is incorporated here by reference. In other embodiments, current torque values may be estimated by measuring a mass air flow through an intake manifold of engine 102 to calculate a potential output torque. Details of this method are discussed in U.S. Pat. No. 7,085,647, the entirety of which is incorporated here by reference. In still other embodiments, other method for detecting or calculating current torque values could also be used. Using this arrangement, ECU 120 may be configured to automatically shift transmission 140 according to various shifting parameters, including current torque values.

Figure 2:
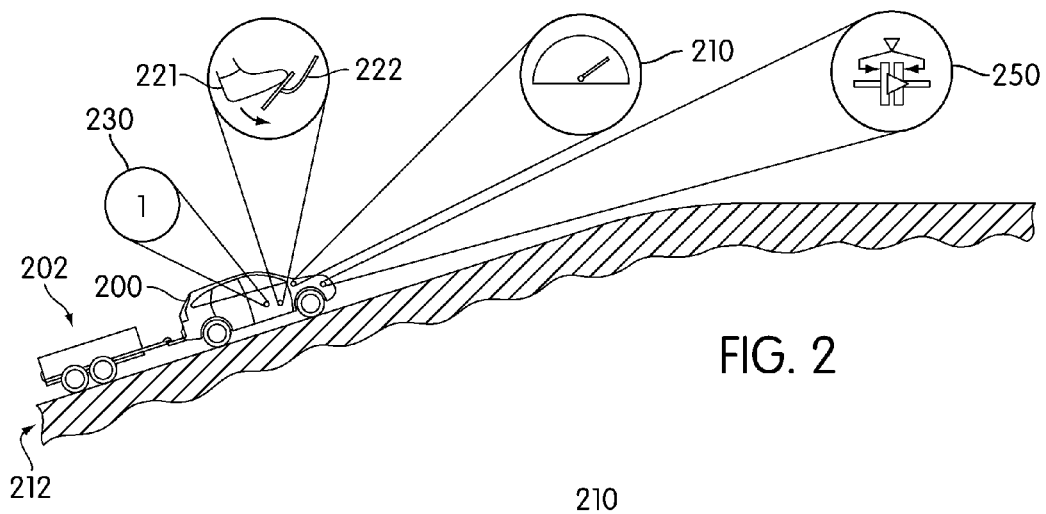
FIG. 2 is a schematic side view of a preferred embodiment of a motor vehicle accelerating up a hill.
Figure 3:
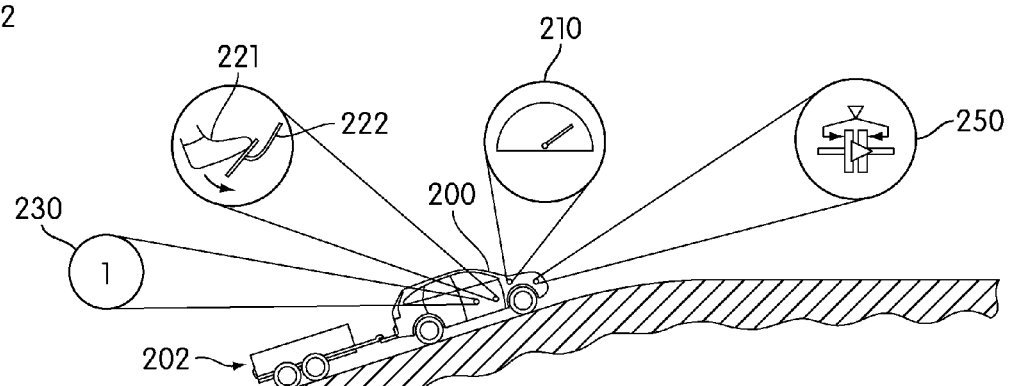
FIG. 3 is a schematic side view of a preferred embodiment of a motor vehicle accelerating up a hill.
Figure 4:
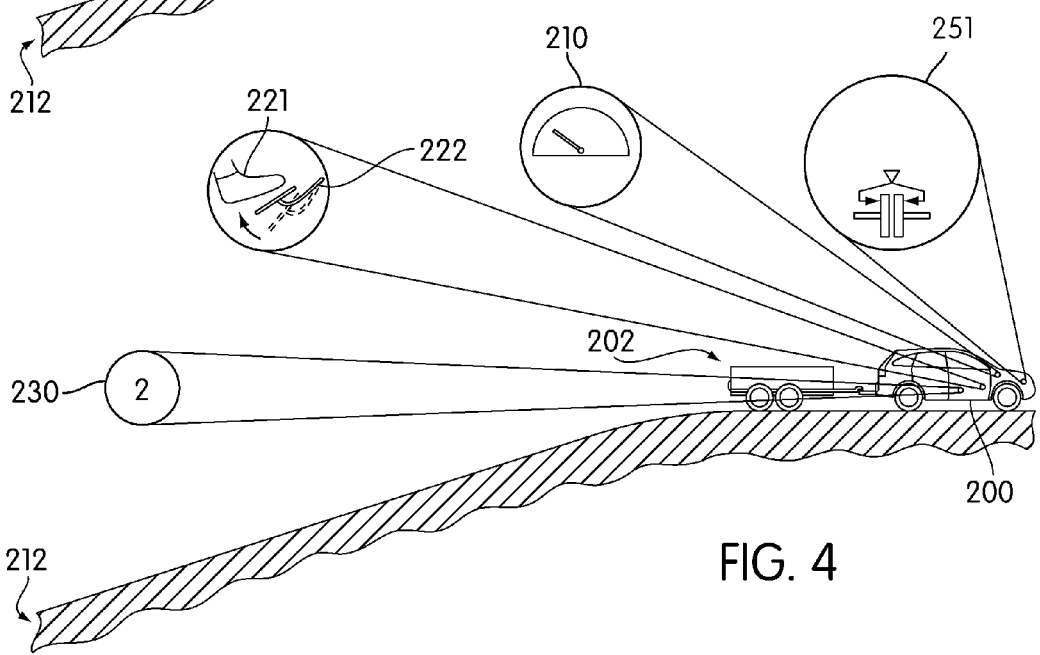
FIG. 4 is a schematic side view of a preferred embodiment of a motor vehicle in second gear at a top of a hill.

FIGS. 2-4 illustrate a preferred embodiment of a situation where an upshift to avoid a shock from one-way clutch overrun is executed only when current torque values approach negative values. In these Figures, motor vehicle 200 is towing trailer 202 up hill 212. In FIG. 2, motor vehicle 200 is preferably accelerating. In this embodiment, driver 221 presses on throttle 222 opening the throttle valve of the engine. The current engine speed is at a particular rate, such as approximately 3000 RPM, for example, as indicated by tachometer 210. Also, transmission mode 230 is set to first gear. The term "transmission mode", as used throughout this detailed description and in the claims, refers to a particular gear ratio of a transmission. Additionally, one-way clutch 250, associated with first gear, is the only clutch engaged.

Referring to FIG. 3, as motor vehicle 200 continues driving up hill 212 towing trailer 202, driver 221 continues pressing on throttle 222 opening the throttle valve of the engine. Tachometer 210 indicates an increase in current engine speed. Current engine speed of motor vehicle 200 may be, for example, 3500 RPM. Preferably, transmission mode 230 remains set at first gear. By remaining in first gear, the torque available for towing trailer 202 up hill 212 is increased. In prior designs, an upshift to second gear to avoid a shock associated with one-way clutch overrun may have occurred and decreased the torque available to motor vehicle 200. In this preferred embodiment, one-way clutch 250 remains the only clutch engaged.

When motor vehicle 200 crests hill 212, driver 221 releases throttle 222 as seen in FIG. 4. As motor vehicle 200 decelerates, and throttle 222 is almost closed, engine torque may decrease and approach a negative value. In this case, transmission mode 230 preferably shifts from first gear to second gear to avoid a shock associated with an overrun on one-way clutch 250. Because transmission mode 230 is now set to second gear, multi-plate clutch 251 associated with second gear is now engaged. Also, the engine speed decreases as indicated by tachometer 210 to a rate, for example, of 2000 RPM.

By avoiding an earlier upshift and instead executing an upshift when current torque values approach negative torque values, a motor vehicle may remain in first gear for a longer period of time. In the embodiment illustrated in FIGS. 2-4, motor vehicle 200 benefits from remaining in first gear while towing trailer 202 up hill 212. This preferred arrangement provides more power and traction when hauling a heavy load up hill 212. Furthermore, with this approach, a shock associated with an overrun on one-way clutch 250 will be circumvented by upshifting as current torque values approach negative values.

Although the preferred embodiment illustrated in FIGS. 2-4 included first gear associated with a one-way clutch and second gear associated with a multi-plate clutch, in other embodiments other gears may be associated with one-way and multi-plate clutches. Motor vehicles in other driving situations may also benefit from remaining in a gear associated with a one-way clutch until shifting parameters, including current torque values, dictate a shift. Generally, shifting parameters, including current torque values, will preferably control gear shifting instead of setting conservative shift lines to avoid a potential one-way clutch overrun. This arrangement may facilitate increased driving power and control.

Additionally, the method discussed in this detailed description is not limited to upshifting between a first gear and a second gear of a transmission. In other embodiments, a shift map may upshift from the first gear directly to a third gear, for example. This third gear is generally associated with a gear ratio that is lower than gear ratios associated with both the first gear and the second gear.

Figure 5:
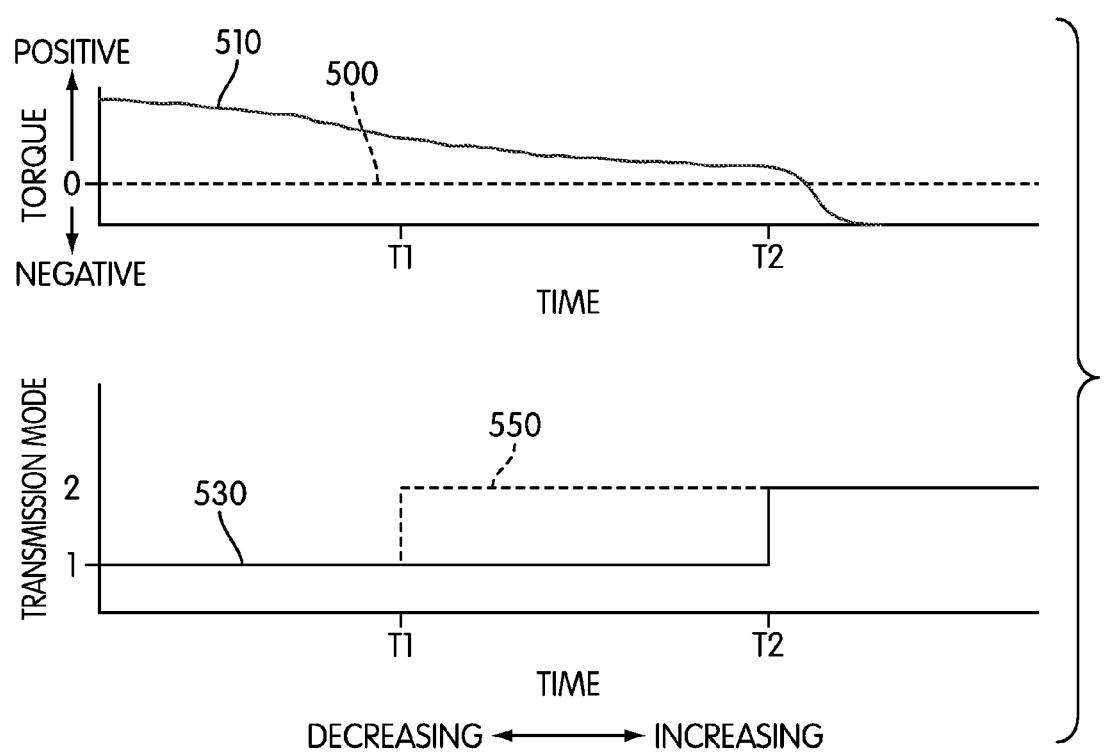
FIG. 5 is a preferred embodiment of a relationship between engine torque and transmission mode as a function of time.

FIG. 5 illustrates a preferred embodiment of a relationship between torque and transmission mode as functions of time. It should be understood that the current embodiment is only intended to be exemplary. In other embodiments, the relationships between torque and transmission mode could be varied.

The relationships discussed here may be associated with the scenario for motor vehicle 200 discussed in FIGS. 2-4. In other words, times before time T1 may be associated with motor vehicle 200 accelerating up hill 212, as in FIG. 2. Times between T1 and T2 may be associated with motor vehicle 200 continuing to accelerate up hill 212, as in FIG. 3. Finally, times after T2 may be associated with motor vehicle 200 decelerating as driver 221 releases the throttle at the top of hill 212, as in FIG. 4.

In this embodiment, prior to time T1, motor vehicle 200 is accelerating and experiencing positive torque, as indicated by torque curve 510. Torque curve 510 may be seen clearly above torque boundary line 500. Also, torque boundary line 500 indicates a boundary between positive and negative torque. At this point, transmission mode 230 is set to first gear, as indicated by first shift curve 530.

At time T1, torque curve 510 has decreased slightly but remains well above torque boundary line 500. In prior designs, an upshift to second gear may occur at time T1 as illustrated by second shift curve 550. This upshift may occur because the prior method is not adaptive to changes in current torque values and is set conservatively high to avoid one-way clutch overrun and a possible ensuing shock. Preferably by monitoring current torque values an upshift is avoided at time T1. In this embodiment, transmission mode 230 remains in first gear, as indicated by first shift curve 530. Using this preferred arrangement, motor vehicle 200 will remain in first gear and may provide increased driving force between times T1 and T2.

When driver 221 releases the throttle at time T2, torque curve 510 continues decreasing and approaches torque boundary line 500. Preferably, an upshift occurs to avoid a shock associated with overrunning one-way clutch 250 and transmission mode 230 increases to second gear. This configuration is indicated by first shift curve 530 for times greater than T2. At some time after T2, torque curve 510 intersects torque boundary line 500 and indicates negative torque. With this preferred arrangement, an upshift to avoid overrunning one-way clutch 250 is performed at time T2 prior to torque curve 510 crossing torque boundary line 500. By avoiding an earlier upshift at time T1, motor vehicle 200 benefits from the driving force of first gear between times T1 and T2.

Using the preferred configuration, first gear may be used during periods of positive torque to increase driving force for an indefinite period of time. In particular, it should be understood that an earlier upshift to avoid one-way clutch overrun may be averted by assessing current torque values. First gear may be maintained and an overrun avoided as long as current torque values remain positive. In some cases, avoiding an early pre-determined upshift may allow a motor vehicle to remain in first gear only a short period of time longer, on the order of a few seconds, before current torque values approach negative torque values. In other cases, current torque values may remain positive and first gear could last much longer than a few seconds.

Figure 6:
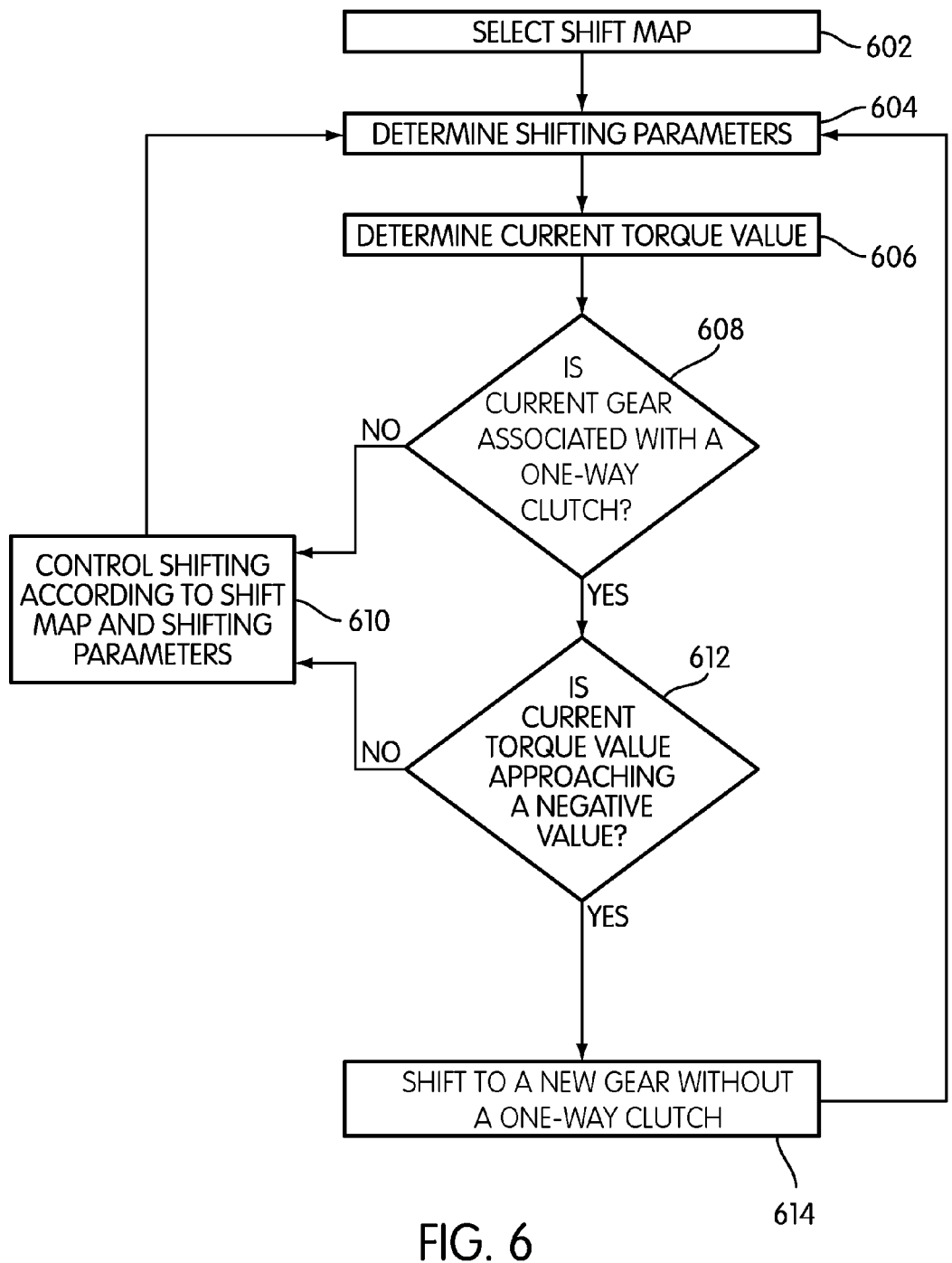
FIG. 6 is a preferred embodiment of a process for operating a transmission with overrun prevention.

FIG. 6 is a preferred embodiment of a process for operating a motor vehicle using current engine torque as a parameter. In particular, the following method includes steps for using a current torque value to determine if a shift is necessary to engage a clutch other than a one-way clutch to avoid a shock associated with one-way clutch overrun. In this embodiment, the following steps are preferably performed by ECU 120; however in some embodiments these steps may be performed by additional systems or devices associated with motor vehicle 100 and engine 102.

For purposed of clarity, the following embodiment discusses shifting in terms of shifting parameters and current torque values. Generally, the term "shifting parameters" as used in this detailed description and throughout the claims includes any parameters that may be considered for shifting other than engine torque. In other words, a set of shifting parameters is intended to include any set of parameters that are used as inputs to standard shift maps used by motor vehicles that may not consider current engine torque as a shifting parameter.

During first step 602, ECU 120 preferably selects a shift map. In a preferred embodiment, ECU 120 may select a shift map based on vehicle driving conditions such as a need for traction control or other factors. The shift map is preferably configured to determine when the transmission mode should be changed according to various inputs including engine speed and vehicle speed. It should be understood that this first step 602 is optional and may not be included in other embodiments.

Following first step 602, ECU 120 preferably proceeds to second step 604. During second step 604, ECU 120 preferably determines shifting parameters. In particular, ECU 120 may receive information regarding vehicle speed, throttle angle, engine speed and transmission mode. In other embodiments, ECU 120 may receive information regarding other parameters as well. Following second step 604, ECU 120 preferably proceeds to third step 606. During third step 606, ECU 120 preferably determines a current torque value. With this preferred arrangement, ECU 120 may consider the current torque value as a parameter while executing a shift map.

After third step 606, ECU 120 proceeds to fourth step 608. During fourth step 608, ECU 120 determines if the current gear is associated with a one-way clutch. If the current gear is operated without a one-way clutch, ECU 120 preferably proceeds to fifth step 610. At fifth step 610, ECU 120 preferably controls shifting according to the shift map and shifting parameters. Following fifth step 610, ECU 120 preferably returns to second step 604 and determines the shifting parameters as previously discussed.

If ECU 120 determines that the current gear is operated with a one-way clutch at fourth step 608, ECU 120 preferably proceeds to sixth step 612. During sixth step 612, ECU 120 determines if the current torque value is approaching a negative value. Generally, the determination of whether the current torque value is approaching a negative value may be achieved in any manner. In some embodiments, an average of torque values over time may be considered to determine if the current torque value is approaching a negative value. In a preferred embodiment, a current torque value may be compared to a threshold torque value.

During sixth step 612, if ECU 120 determines that the current torque value is not approaching a negative value, ECU 120 preferably proceeds to fifth step 610 which has been previously discussed. However, if ECU 120 determines that the current torque value is approaching a negative value, ECU 120 preferably proceeds to seventh step 614. At seventh step 614, ECU 120 directs transmission 140 to shift to a gear without a one-way clutch. Following seventh step 614, ECU 120 proceeds to second step 604 which has been previously discussed.

With this preferred arrangement, ECU 120 may determine a current torque value and shift to a gear without a one-way clutch when the current torque value approaches a negative value. This configuration allows a transmission to remain in a gear associated with a one-way clutch as long as other shifting parameters are satisfied instead of changing gears at an arbitrary pre-determined shifting point to avoid a shock associated with a potential one-way clutch overrun.

Figure 7:
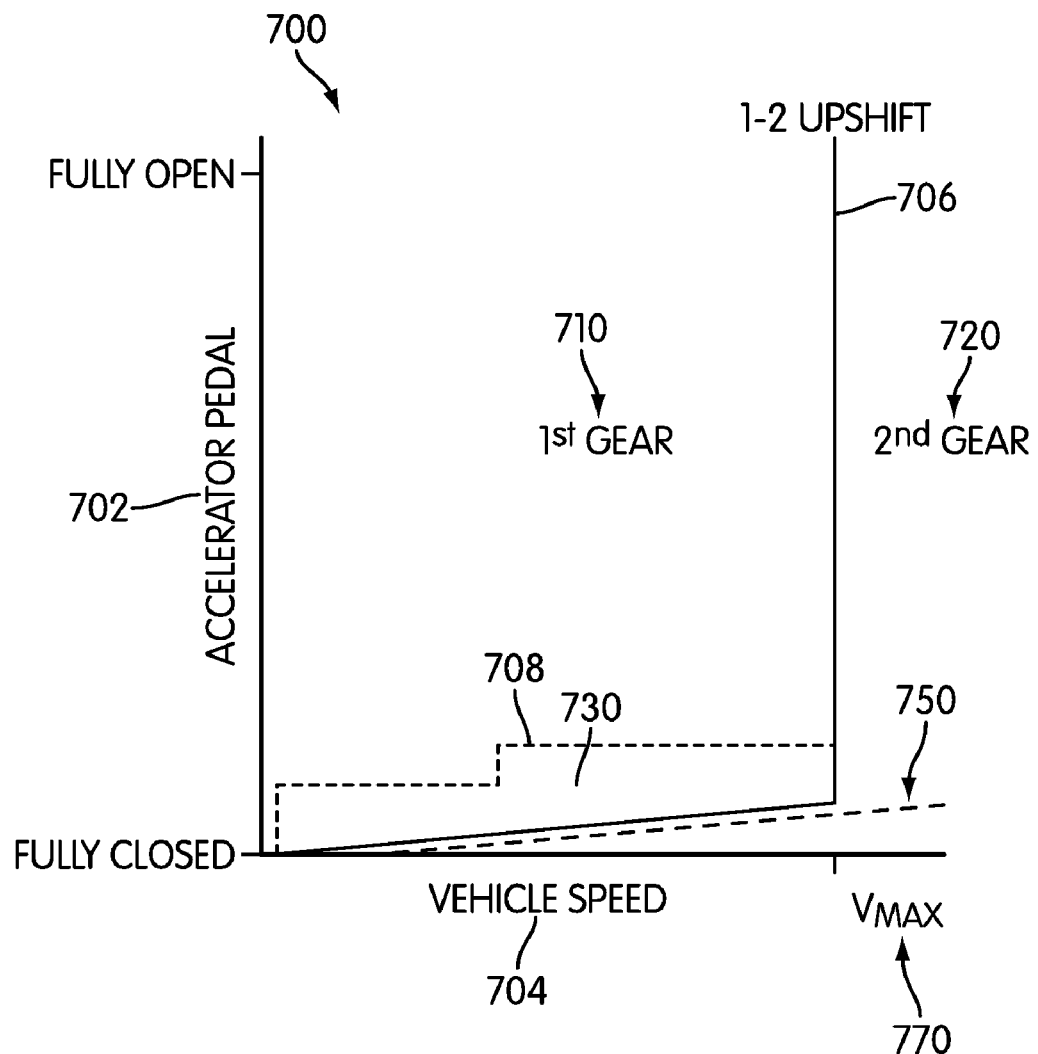
FIG. 7 is an exemplary embodiment of a portion of a shift map.

FIG. 7 illustrates an exemplary embodiment of a portion of shift map 700. Generally, a shift map may be stored in memory accessible by an electronic control unit or some type of computer associated with a motor vehicle. In some embodiments, an electronic control unit may use the shift map to control a transmission. In this preferred embodiment, an electronic control unit accesses shift map 700 to determine an appropriate transmission mode. In particular, shift map 700 as illustrated here is a portion of a shift map used to determine whether to operate the transmission in first or second gear.

Typically, a shift map includes inputs from various shifting parameters to determine when to change a transmission mode. In some embodiments, a shift map may include inputs such as vehicle speed and engine speed to determine when a transmission mode should be changed. In this exemplary embodiment, shift map 700 includes inputs from accelerator pedal 702 and vehicle speed 704 to determine the appropriate transmission mode. Generally, the position of accelerator pedal 702 may be associated with a throttle angle. With this arrangement, the position of accelerator pedal 702 and vehicle speed 704 determine a point on shift map 700.

Additionally, shift map 700 may be associated with first shift line 706. Preferably, first shift line 706 is configured as a boundary dividing first gear region 710 and second gear region 720 of shift map 700. First gear region 710 includes various values of vehicle speed 704 associated with positions of accelerator pedal 702 and indicates the appropriate transmission mode is first gear. Likewise, second gear region 720 includes various values of vehicle speed 704 associated with positions of accelerator pedal 702 and indicates the transmission should be operated in second gear. At $V_{max}$ 770 first shift line 706 is oriented substantially vertically so that most values of vehicle speed 704 greater than $V_{max}$ 770 associated with some opening of accelerator pedal 702 lie within second gear region 720. With this arrangement, first shift line 706 marks a boundary between first gear region 710 and second gear region 720 and indicates an upshift to second gear at first shift line 706.

Preferably, first shift line 706 is configured to indicate a transmission mode of second gear during scenarios when an engine may produce negative torque. For purposes of clarity, zero torque line 750 is illustrated on shift map 700. Regions below zero torque line 750 are associated with negative torque. Likewise, regions above zero torque line 750 may be associated with positive torque. Generally, a shift map will not include a torque line delineating a boundary between positive and negative torque. Instead, as previously discussed, current torque values may be calculated in real-time by an electronic control unit using a flexplate or by some other method. However, in this exemplary embodiment, zero torque line 750 is included to illustrate that first shift line 706 lies close to and above zero torque line 750. With this arrangement, regions of shift map 700 associated with negative torque are in second gear region 720. This configuration of first shift line 706 avoids a potential shock to a drivetrain of a motor vehicle from an overrunning one-way clutch by commanding an upshift to second gear, which does not include a one-way clutch, when current torque values approach negative torque values.

As described earlier, prior methods not adaptive to changes in current torque values avoid one-way clutch overrun in first gear by setting shift lines conservatively high to avoid potential negative torque. In this exemplary embodiment, second shift line 708 is associated with prior methods not adaptive to changes in current torque values. In particular, second shift line 708 is disposed significantly above both first shift line 706 and zero torque line 750 until second shift line 708 reaches $V_{max}$ 770 and joins first shift line 706. With this arrangement, second shift line 708 may require an upshift to second gear to avoid negative torque although current torque values indicated by zero torque line 750 remain positive.

A transmission controlled by second shift line 708 will operate in first gear in fewer situations than a transmission controlled by first shift line 706. In particular, region 730 circumscribes a set of values of vehicle speed 704 associated with relatively closed positions of accelerator pedal 702 that will be designated with a transmission mode of first gear if first shift line 706 is followed and second gear if second shift line 708 is followed. As previously discussed, upshifting to second gear earlier than necessary may be undesirable because it reduces traction and available power. By remaining in first gear in region 730, first shift line 706 increases the power available to a motor vehicle.

The shift map in this embodiment is intended to be exemplary. In other embodiments, a shift map will have shift lines disposed in a different manner. In some cases, a shift map will include upshift lines as well as downshift lines. In particular, shift maps may be configured differently under different engine loads.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of operating a motor vehicle, comprising the steps of:
   receiving a set of shifting parameters;
   calculating a current torque value associated with a real-time engine torque; and
   shifting from a first gear with a one-way clutch to a second gear without a one-way clutch when the current torque value is sufficiently close to a negative torque value to substantially prevent an overrun condition of the one-way clutch.

2. The method according to claim 1, wherein the first gear is associated with a first gear ratio.

3. The method according to claim 2, wherein the second gear is associated with a second gear ratio.

4. The method according to claim 3, wherein the first gear ratio is greater than the second gear ratio.

5. The method according to claim 1, wherein the set of shifting parameters includes a throttle angle.

6. The method according to claim 1, wherein the set of shifting parameters includes a vehicle speed.

7. A method of operating a motor vehicle, comprising the steps of:
  receiving a set of shifting parameters;
  calculating a current torque value associated with a real-time engine torque;
  determining a current gear;
  determining if the current gear is associated with a one-way clutch;
  executing a shift according to a shift map, the set of shifting parameters and the current engine torque when the current gear is associated with the one-way clutch; and
  executing a shift according to the shift map and the set of shifting parameters otherwise.

8. The method according to claim 7, wherein the one-way clutch is associated with a first gear of a transmission.

9. The method according to claim 8, wherein a second gear of the transmission includes only multi-plate clutches.

10. The method according to claim 9, wherein the step of determining the current gear includes a step of determining if the current gear is the first gear.

11. The method according to claim 10, wherein the step of executing the shift includes a step of shifting from the first gear to the second gear when the current engine torque is approaching a substantially negative value.

12. The method according to claim 11, wherein the step of executing the shift includes a step of holding first gear when the current engine torque is substantially positive.

13. A method of operating a motor vehicle to reduce the possibility of shock associated with a transmission, comprising the steps of:
  receiving a set of shifting parameters;
  calculating a current torque value associated with a real-time engine torque; and
  upshifting from a first gear associated with a one-way clutch to avoid shock to the transmission when the current torque value is sufficiently close to a negative value.

14. The method according to claim 13, wherein the step of upshifting includes a step of upshifting from the first gear to a second gear.

15. The method according to claim 14, wherein the step of upshifting includes a step of upshifting from the first gear to a third gear.

16. The method according to claim 15, wherein the first gear has a first gear ratio that is greater than a second gear ratio associated with the second gear.

17. The method according to claim 15, wherein the first gear has a first gear ratio that is greater than a third gear ratio associated with the third gear.

18. The method according to claim 13, wherein the step of calculating the current torque value includes a step of receiving information from a sensor.

19. The method according to claim 18, wherein the sensor is associated with a flexplate that is configured to deform under changes in engine torque.

20. The method according to claim 18, wherein the sensor is configured to monitor mass air flow through an intake manifold of the engine.

* * * * *